US008192114B2

(12) United States Patent
Chang

(10) Patent No.: US 8,192,114 B2
(45) Date of Patent: Jun. 5, 2012

(54) COMBINATION OF CENTER DRILL AND DRILL HOLDING TOOL

(76) Inventor: Hsin-Tien Chang, Taiping (TW)

( * ) Notice: Subject to any disclaimer, the term of this patent is extended or adjusted under 35 U.S.C. 154(b) by 788 days.

(21) Appl. No.: 12/367,576

(22) Filed: Feb. 9, 2009

(65) Prior Publication Data

US 2010/0202844 A1    Aug. 12, 2010

(51) Int. Cl.
    B23B 51/06    (2006.01)
    B23B 51/10    (2006.01)
(52) U.S. Cl. ............... 408/224; 408/233; 408/239 R; 407/85; 407/103; 407/108; 407/113
(58) Field of Classification Search ............... 408/224, 408/225, 233; 407/48, 85–87, 103, 104, 407/106–108, 113; B23B 51/10
    See application file for complete search history.

(56) References Cited

U.S. PATENT DOCUMENTS

| 2,004,333 | A | * | 6/1935 | Maurer | 408/215 |
| 3,076,357 | A | * | 2/1963 | Benjamin et al. | 408/211 |
| 3,466,720 | A | * | 9/1969 | Stier | 407/113 |
| 3,484,919 | A | * | 12/1969 | Stier | 407/77 |
| 3,490,117 | A | * | 1/1970 | Hertel | 407/104 |
| 3,672,016 | A | * | 6/1972 | Melinder | 407/104 |
| 4,174,916 | A | * | 11/1979 | Kezran | 407/108 |
| 4,527,930 | A | * | 7/1985 | Harroun | 407/42 |
| 5,004,379 | A | * | 4/1991 | Little | 407/113 |
| 5,308,197 | A | * | 5/1994 | Little | 407/101 |
| 5,727,910 | A | * | 3/1998 | Leeb | 407/34 |
| 5,921,721 | A | * | 7/1999 | Hintze et al. | 407/113 |
| 6,481,936 | B1 | * | 11/2002 | Hecht | 407/111 |
| 6,527,486 | B2 | * | 3/2003 | Wiman et al. | 408/188 |
| 6,565,296 | B2 | * | 5/2003 | McKinley et al. | 408/224 |
| 6,623,216 | B2 | * | 9/2003 | Hansson | 407/83 |
| 6,736,574 | B2 | * | 5/2004 | Persson et al. | 407/77 |
| 6,769,843 | B2 | * | 8/2004 | Hansson | 407/91 |
| 6,848,869 | B2 | * | 2/2005 | Stokey | 408/227 |
| 6,942,434 | B2 | * | 9/2005 | Friedman et al. | 407/113 |
| 6,960,049 | B2 | * | 11/2005 | Inayama | 407/103 |
| 6,986,626 | B2 | * | 1/2006 | Gati | 407/113 |
| 7,001,115 | B2 | * | 2/2006 | Erickson et al. | 407/113 |
| 7,070,363 | B2 | * | 7/2006 | Long et al. | 407/113 |
| 7,094,006 | B2 | * | 8/2006 | Hecht | 407/102 |
| 2010/0178118 | A1 | * | 7/2010 | Hecht | 407/44 |
| 2011/0318118 | A1 | * | 12/2011 | Hodza et al. | 407/44 |

FOREIGN PATENT DOCUMENTS

GB    2070472 A  *  9/1981

\* cited by examiner

Primary Examiner — Eric A Gates

(57) ABSTRACT

A drill holding tool includes a shaft and a drill-holding portion which has a recess defined axially in an outer periphery thereof so as to receive a flat center drill therein which has one end protrudes out from the distal end of the drill-holding portion. The recess is defined by two sidewalls and a bottom surface, and a threaded hole is defined through the bottom surface. Two semi-circular reception holes are defined in two insides of the two sidewalls and two positioning pieces are received in the reception holes. The center drill includes a positioning hole corresponding to the threaded hole in the recess and two semi-circular positioning notches in which the two positioning pieces are partially received. The center drill is a flat piece which saves material required and the positioning notches allow the center drill to be quickly and precisely positioned.

9 Claims, 7 Drawing Sheets

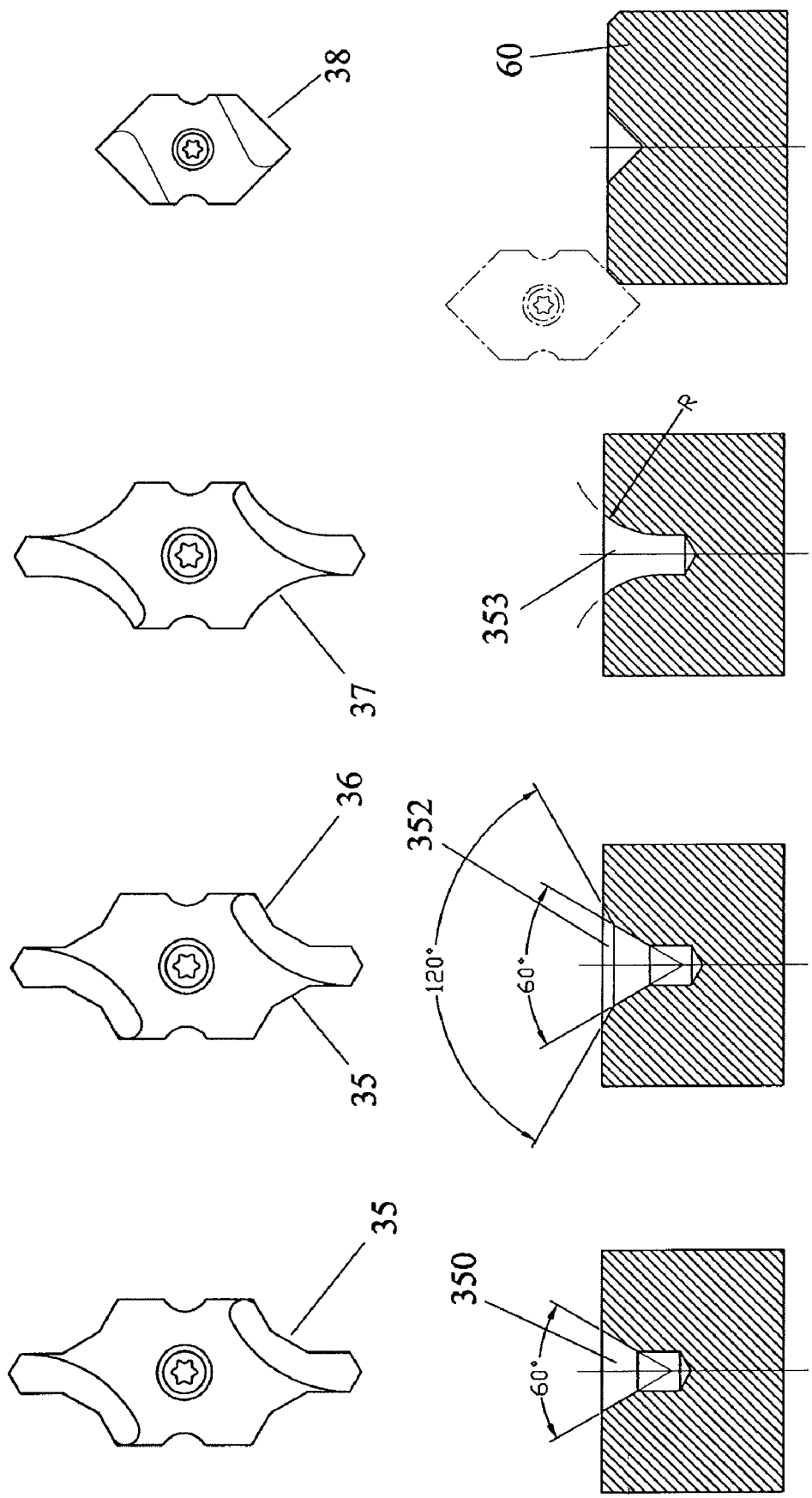

COMBINATION OF CENTER DRILL AND DRILL HOLDING TOOL

FIELD OF THE INVENTION

The present invention relates to a center drill assembly including a center drill and a drill holding tool, the center drill is a flat drill and can be quickly and precisely connected to the holding tool.

BACKGROUND OF THE INVENTION

A conventional center drill 50 is disclosed in FIG. 12 and generally includes a cylindrical shank 51 which is sized to be clamped by the chuck of machine (not shown). Two bits 52 are connected both ends of the shank 51 and the size of the bits 52 are vary according to the size of the shank 51. If the size of the bit is 1.6 mm, the shank 51 will be 4.0 mm, the size of the bit is 4.0 mm, the shank 51 will be 10.0 mm, and the size of the bit is 10.0 mm, the shank 51 will be 25.0 mm. In other words, the larger the bit size is, the larger the shank will be. However, the shank 51 does not have any further function except being connected to the chuck of machine, so that most of the center drills are made by High Speed Steel (HSS) which is inexpensive.

The HSS cannot cut at high speed and the slow movement of the center drill means a longer processing time is required which increases the cost. In order to work rapidly, the center drill can be made by Tungsten Carbide and the center drill made of Tungsten Carbide is able to drill objects 5 to 20 times faster than the HSS made center drill. Nevertheless, the cost of the Tungsten Carbide is 10 times of that of HSS. The shank requires much more material than the bit and usually contributes most of the expense of the Tungsten Carbide.

The present invention intends to provide a flat center drill and the drill holding tool, wherein the flat center drill saves significant material and can be easily and precisely connected to the holding tool.

SUMMARY OF THE INVENTION

The present invention relates to a combination of a center drill and a drill holding tool, wherein the drill holding tool includes a shaft and a drill-holding portion which includes a recess defined axially in an outer periphery thereof so as to receive the flat center drill. The recess is defined by two sidewalls and a bottom surface. Two reception holes are defined in two insides of the two sidewalls of the recess and a threaded hole is defined through the bottom surface. Two positioning pieces are received in the reception holes and the center drill is partially engaged with the recess.

The primary object of the present invention is to provide a flat center drill which is a flat piece so that the material required is saved. The flat center drill can be easily and precisely engaged with the recess defined in the drill-holding portion of the drill holding tool.

The present invention will become more obvious from the following description when taken in connection with the accompanying drawings which show, for purposes of illustration only, a preferred embodiment in accordance with the present invention.

BRIEF DESCRIPTION OF THE DRAWINGS

FIGS. 8 to 11 show different shapes of the holes that are drilled by different shapes of the center drill of the present invention.

DETAILED DESCRIPTION OF THE PREFERRED EMBODIMENT

Figure 1:
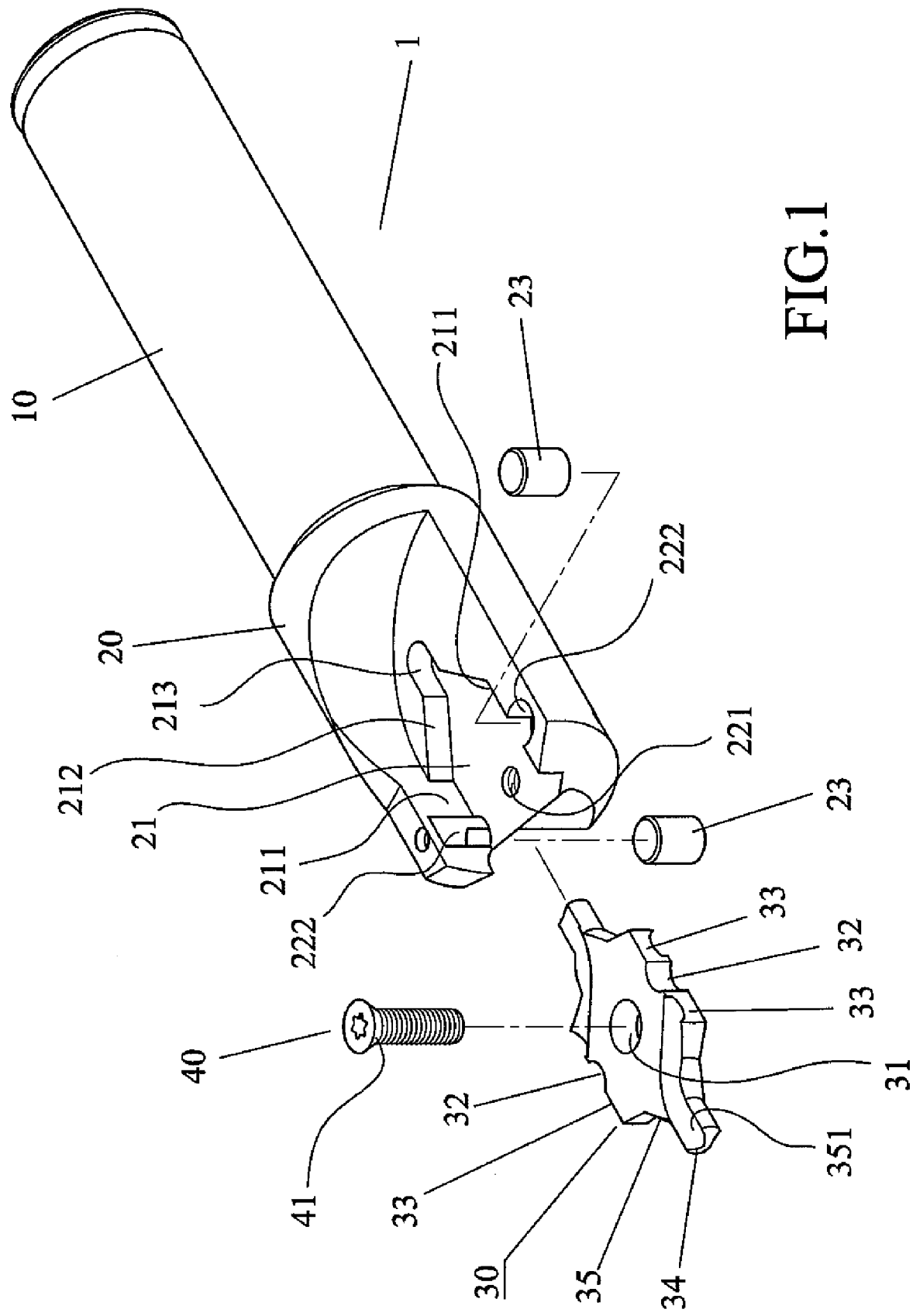
FIG. 1 is an exploded view to show the center drill and the drill holding tool of the present invention.
Figure 2:
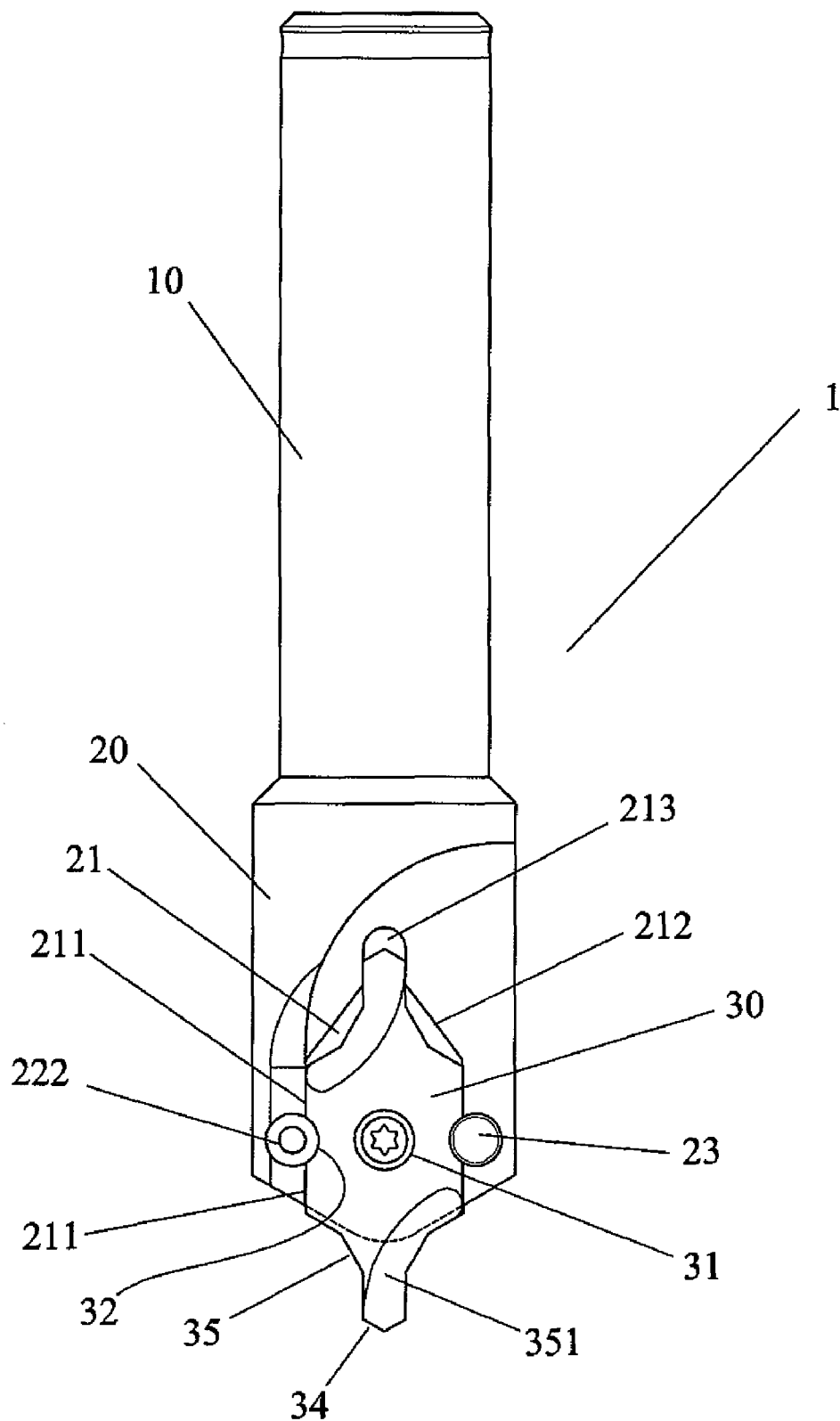
FIG. 2 shows that the center drill is connected to the drill holding tool of the present invention.
Figure 4:
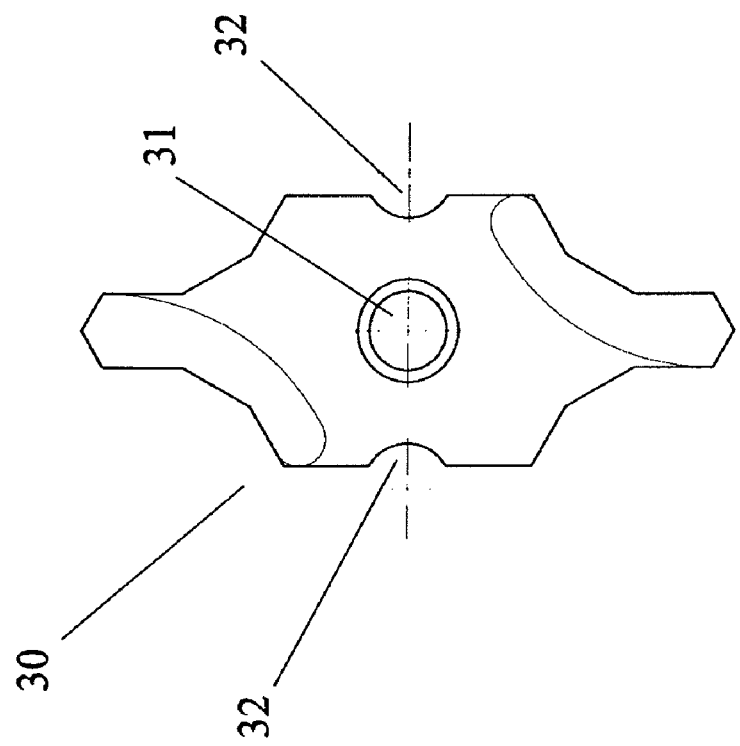
FIG. 4 shows the center drill of the present invention.

Referring to FIGS. 1, 2 and 4, the drill holding tool 1 of the present invention includes a shaft 10 and a drill-holding portion 20, the shaft 10 is a cylindrical shaft which is clamped by the chuck of machine (not shown). The length and the shape of the shaft 10 can be different according to the types of the chucks of machine. The drill-holding portion 20 includes a recess 21 defined axially in an outer periphery thereof, the recess 21 is defined by two sidewalls and a bottom surface. A threaded hole 221 is defined through the bottom surface and two semi-circular reception holes 222 are defined in two insides of the two sidewalls of the recess 21. Each of the two insides of the sidewalls includes a first straight side 211 which is perpendicular to the bottom surface. Two inclined surfaces 212 are respectively connected to two respective ends of the two first straight sides 211, and a centering notch 213 is located at the conjunction of the two inclined surfaces 212.

The center drill 30 is a flat piece and includes a positioning hole 31 defined through a center thereof and two second straight surfaces 33 are defined in two sides of the center drill 30. Two semi-circular positioning notches 32 are defined in two second straight surfaces 33 of the center drill 30. When fitting the center drill 30 in the recess 21 of the drill-holding portion 20, the first and second straight sides 211, 33 are matched to each other and the two positioning notches 32 are cooperated with the reception holes 222 to receive two positioning pieces 23. Each of the two positioning pieces 23 partially received in the reception holes 222 and partially received in the two positioning notches 32. A bolt 40 extends through the positioning hole 31 and is threadedly connected to the threaded hole 221 to fix the center drill 30 in the recess 21. Two bits 34 extend from two ends of the center drill 30 and one of the two bits 34 is engaged with the centering notch 213 and the other bit 34 protrudes out from the distal end of the drill-holding portion 20. Each of the two bits 34 includes a tip defined by two tapered sides. A groove 351 is defined in one of two surfaces of each bit 34 so as to quickly remove surplus material out from the bit 34 and the object (not shown). Two cutting edges 35 are defined between the bits 34 and the second straight sides 33.

Figure 3:
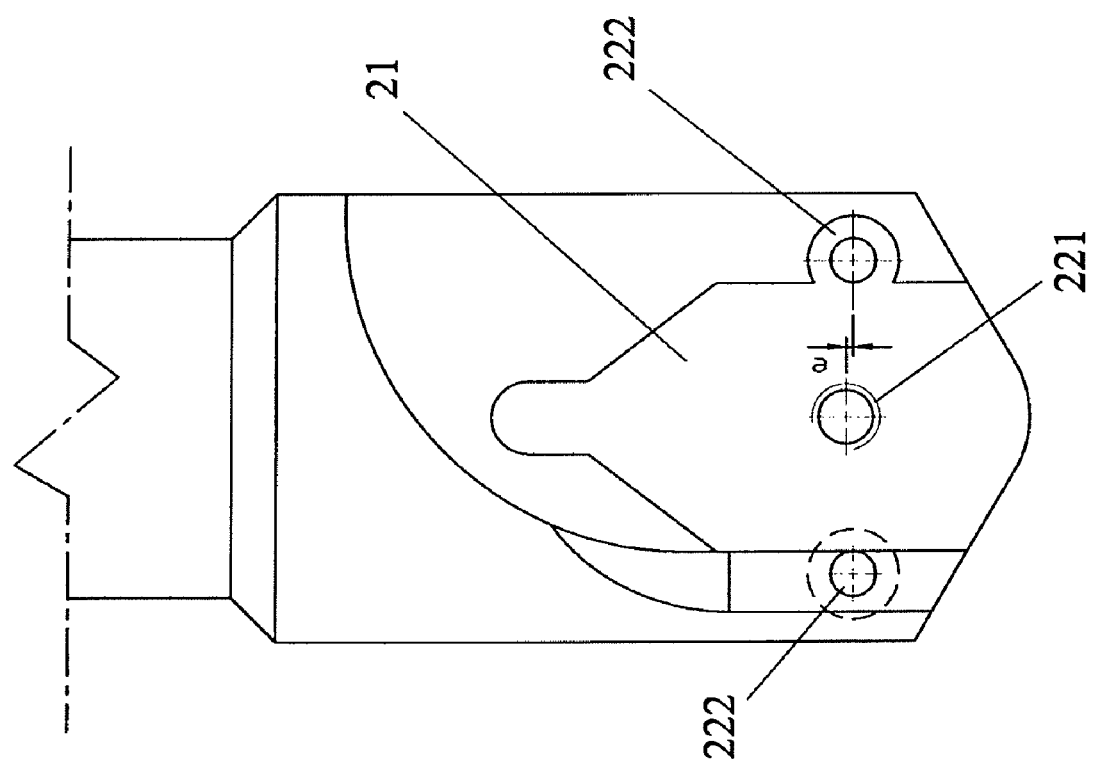
FIG. 3 shows that a distance is defined between two respective axes of the threaded hole of the drill-holding portion and the positioning hole of the center drill.
Figure 5:
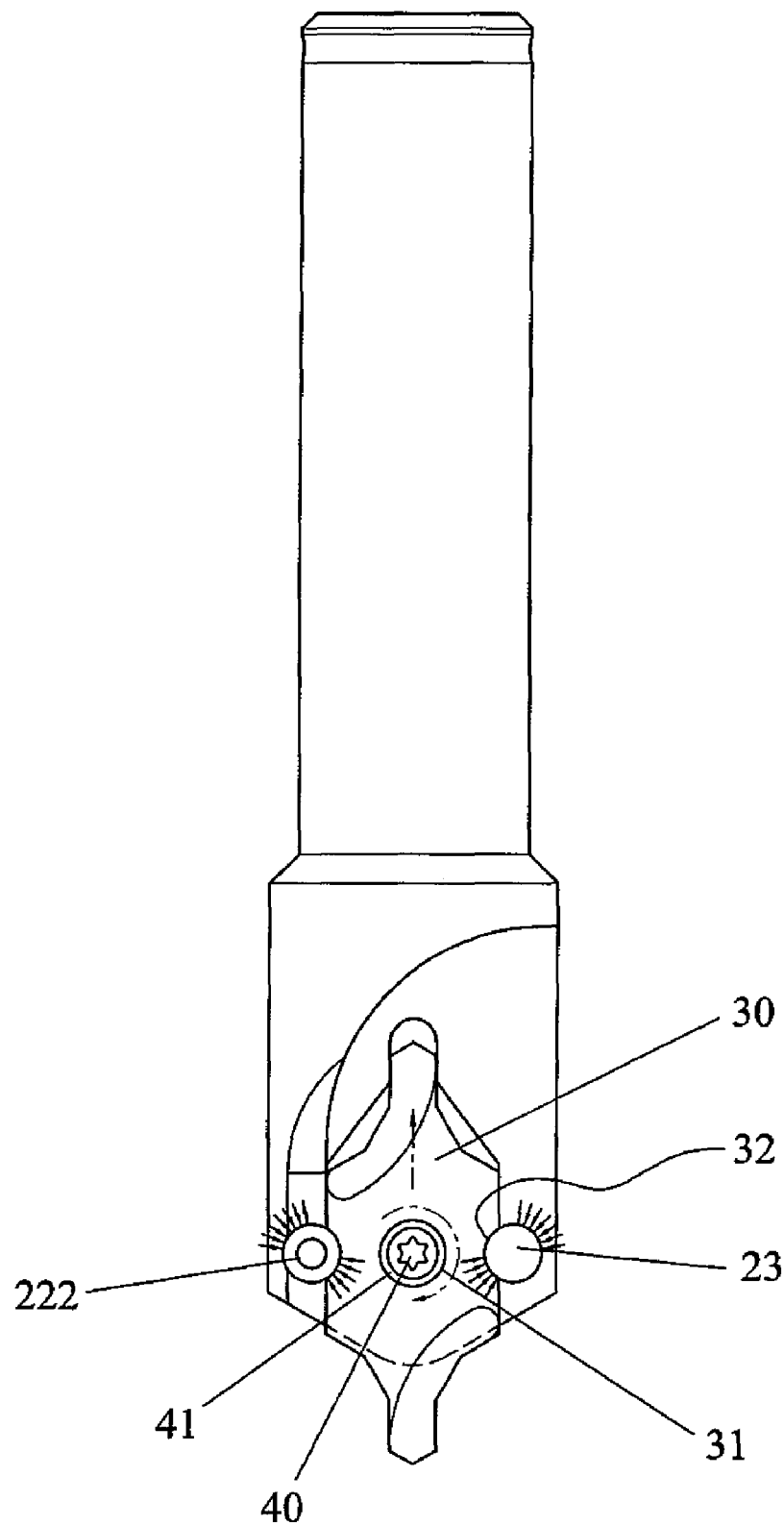
FIG. 5 shows stress applied to the center drill and the drill-holding portion.

As shown in FIG. 3, there is a distance "e" defined between two respective axes of the positioning hole 31 and the threaded hole 221, the axis of the threaded hole 221 is the same as the axis of the two reception holes 222. The distance "e" is defined in the axis direction of the drill-holding portion 20 and the center drill 30. The axis of threaded hole 221 is the distance "e" higher than the axis of the positioning hole 31 and the axes of the reception holes 222. The distance "e" is 0.15 mm in this embodiment. When the bolt 40 extends through the positioning hole 31 and is threadedly connected to the threaded hole 221, the head 41 of the bolt 40 will push the center drill 30 upward to firmly match the positioning notches 32 with the positioning pieces 23 as shown in FIG. 2 and the stress applied to the center drill 30 and the drill-holding portion 20 is disclosed in FIG. 5. The diagram for the stress also represents the stress applied to the center drill 30 when drilling an object.

By the specific arrangement, the center drill 30 is easily set to its designated position in the recess 21. Because the center drill 30 is a flat piece so that it can be made by Tungsten Carbide at lower cost when compared with the conventional center drill. The Tungsten Carbide made center drill 30 can be operated at high speed.

Figure 7:
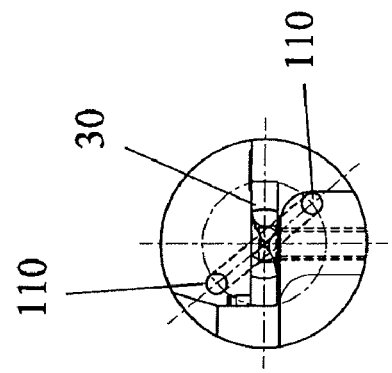
FIG. 7 is an end view to show the positions of the lubrication ducts.
Figure 6:
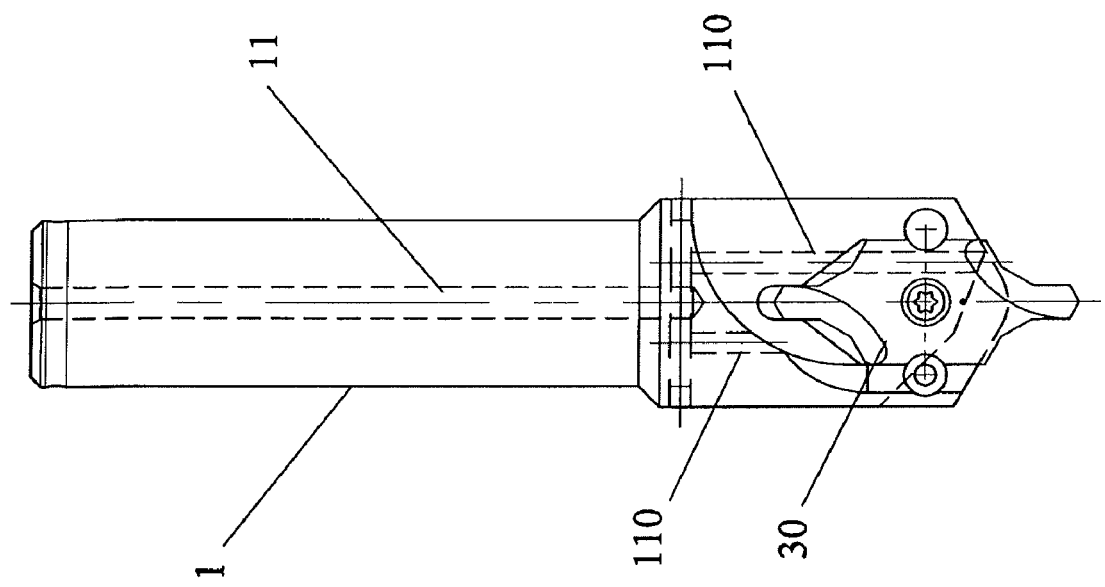
FIG. 6 shows that lubrication ducts are provided in the drill holding tool.
Figure 12:
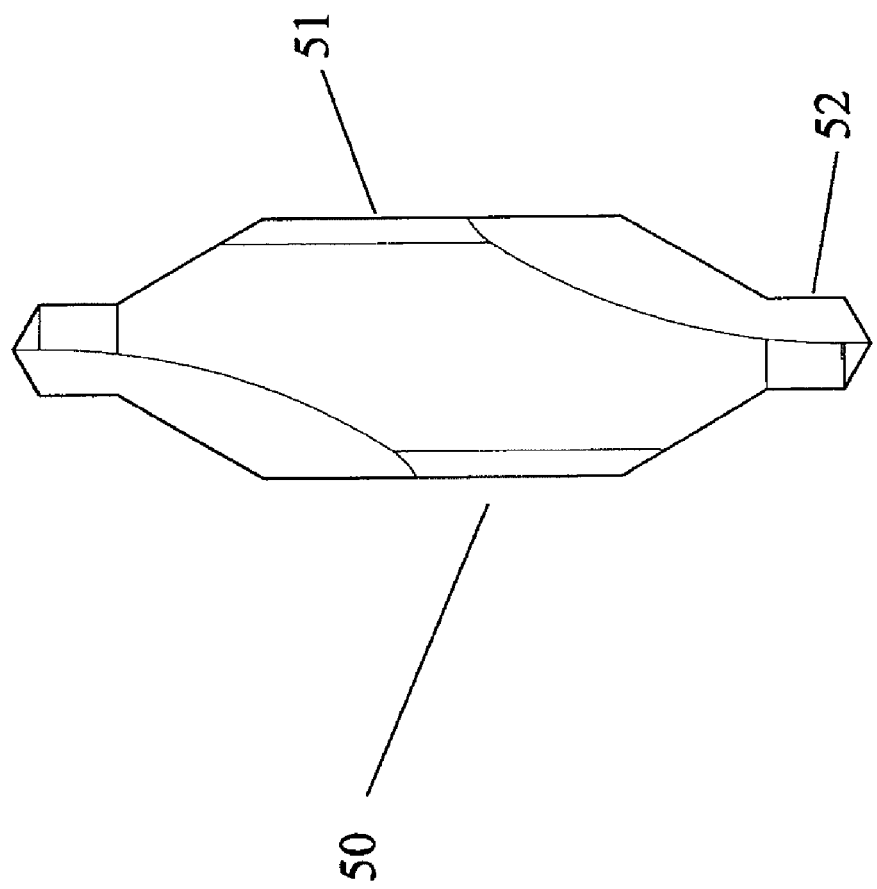
FIG. 12 shows a conventional center drill.

As disclosed in FIGS. 6 and 7, the drill holding tool 1 includes a lubricant duct 11 defined in the shaft 10 and the lubricant duct 11 splits into two sub-ducts 110 located on two sides of the center drill 30 to release heat from the center drill 30.

FIGS. 8 to 10 show that different shapes of the cutting edges 35 can obtain different shapes of hole in the object. FIG. 8 shows the object is drilled into a hole with a 60-degree divergent opening 350 by the cutting edges 35 including two angular edges. FIG. 9 shows the object is drilled into a multi-stage sinkhole with a 60-degree and 120-degree divergent openings 352. This is because the center drill 30 includes two top cutting edges 36 which are connected from the cutting edges 35 at an angle. FIG. 10 shows that the center drill 30 includes two curved cutting edges 37 so as to drill a hole 353 with an inner periphery of radius "R". Further referring to FIG. 11, the center drill 30 may have two straight cutting edges 38 to drill a 90-degree hole in the object 60, and also can remove the corner material or even be used as a sculpture tool to have patterns or characters in the object 60. The drill holding tool 1 of the present invention is able to securely hold different types of drills or blades to achieve different kinds of tasks.

While we have shown and described the embodiment in accordance with the present invention, it should be clear to those skilled in the art that further embodiments may be made without departing from the scope of the present invention.

What is claimed is:

1. A combination of a center drill and a drill holding tool, wherein: the drill holding tool includes a shaft and a drill-holding portion, the drill-holding portion includes a recess axially corresponding to an axis of the drill holding tool, the recess is defined by two sidewalls and a bottom surface, a threaded hole is defined through the bottom surface and two reception holes are separately defined in the two sidewalls of the recess, two positioning bars are separately received in the reception holes and are independent pieces, the center drill is partially engaged with the recess, the center drill includes a positioning hole defined through a center thereof and two second straight surfaces are defined in two sides of the center drill, two positioning notches are defined in the two second straight surfaces of the center drill, the first and second straight sides are matched to each other, a trough is formed by each of the two positioning notches and one of the reception holes to receive one of the positioning bars, a bolt extends through the positioning, hole and is threadedly connected to the threaded hole, two bits extend from two ends of the center drill, cutting edges are defined between the bits and the second straight sides, and the center drill placed in the recess is coaxial with the drill holding tool.

2. The combination as claimed in claim 1, wherein each of the reception holes is a semi-circular hole, and each of the positioning notches is a semi-circular hole.

3. The combination as claimed in claim 1, wherein each of the two insides of the sidewalls includes a first straight side which is perpendicular to the bottom surface.

4. The combination as claimed in claim 3, wherein two inclined surfaces are respectively connected to two respective ends of the two first straight sides, a centering notch is located at the conjunction of the two inclined surfaces.

5. The combination as claimed in claim 1, wherein each of the two bits includes a tip defined by two tapered sides.

6. The combination as claimed in claim 1, wherein a distance is defined between two respective axes of the positioning hole and the threaded hole.

7. The combination as claimed in claim 1, wherein the cutting edges includes two angular edges.

8. The combination as claimed in claim 1, wherein the cutting edges are two curved cutting edges with a radius.

9. The combination as claimed in claim 1, wherein the cutting edges are two straight cutting edges.

* * * * *